Jan. 31, 1956 J. T. MELETIO 2,733,036
MOUNTS FOR ELECTRICAL FIXTURES
Filed July 11, 1951
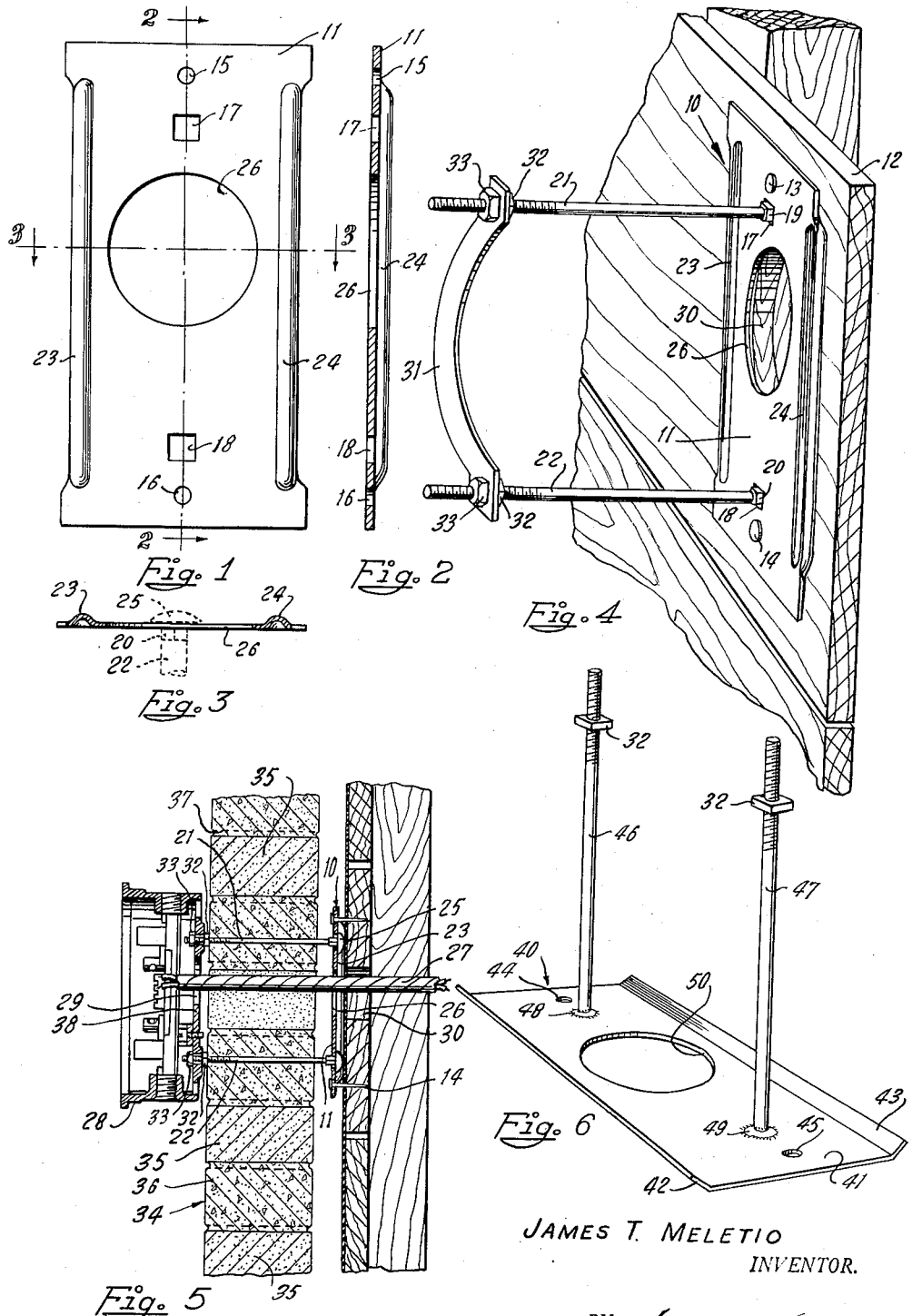
JAMES T. MELETIO
INVENTOR.
BY
ATTORNEY

United States Patent Office 2,733,036
Patented Jan. 31, 1956

2,733,036

MOUNTS FOR ELECTRICAL FIXTURES

James T. Meletio, Dallas, Tex.

Application July 11, 1951, Serial No. 236,198

6 Claims. (Cl. 248—205)

This invention relates to mounts for electrical fixtures and more particularly to a mount for fixing electric meter sockets in place in the exterior of brick veneer buildings or the like.

Electric meters are conventionally and desirably affixed to an exterior wall of a building so that they may be read by a meterman at any time without entering the building. The meter sockets of such meters have heretofore been conventionally affixed to buildings of the brick veneer type by expansion or toggle bolts or the like which are inserted through holes made in the brick veneer by the use of star drills or the like. The drilling of holes through the brick veneer is a costly time-consuming process and the expansion bolts frequently pull loose. It is desirable, therefore, that a meter socket mount be provided which may be secured to the building before the brick veneer is laid so that the need for drilling holes in the brick veneer may be eliminated and the danger of the bolts pulling loose obviated. It is also desirable in some instances that the mount be capable of being disassembled and packed in small packages for ease and economy in packing and shipping.

Accordingly, it is an object of this invention to provide a new and improved mount for meter sockets.

It is another object of the invention to provide a new and improved mount for meter sockets which may be affixed to the storm sheathing, header, or a cross-piece of the interior structure of the wall of a building before the brick veneer of the building is laid adjacent the wall, and which is provided with supporting members for receiving and supporting the meter socket after the veneer wall is laid.

A further object of the invention is to provide a mount of the character described wherein the meter socket supports are provided with adjustable stop and clamping members for positively holding the socket at desired positions thereon.

It is still another object of this invention to provide a new and improved mount for meter sockets which may be disassembled for shipping in a small package.

It is a further object of the invention to provide a new and improved mount for meter sockets having a plate which may be affixed to the sheathing or a cross-piece of an interior wall of a building and a pair of elongate bolts extending perpendicularly from the plate, the outer ends of said bolts being arranged to receive and support a meter socket after a brick veneer wall is laid adjacent the interior wall.

Briefly stated, the new and improved mount of the invention includes an elongate plate having a pair of strengthening ribs which also serve to space the plate from the sheathing or crosspiece of an interior wall to which the plate is secured by nails or the like driven through suitable apertures in the plate. The plate is also provided with a pair of spaced rectangular openings outwardly through which supporting bolts extend. The supporting bolts are formed with rectangular enlargements or bosses near their heads, and these bosses engage in the rectangular holes in the plate. The outer ends of the suporting bolts may be positively held in proper spaced position while the brick veneer is being laid by a strap secured to the outer ends of the bolts. In another embodiment of the invention, elongate bolts are welded to the plate to extend perpendicularly therefrom.

Additional objects and advantages of the invention will be readily apparent from the reading of the following description of the method and apparatus for carrying out the same in accordance with the invention, and reference to the accompanying drawings thereof, wherein:

Figure 1 is a front plan view of an elongate plate forming a part of the meter mount;

Figure 2 is a longitudinal sectional view of the plate taken on the line 2—2 of Figure 1;

Figure 3 is a transverse sectional view of the plate taken on the line 3—3 of Figure 1;

Figure 4 is a perspective view showing the meter mount employing the plate illustrated in Figures 1 to 3 affixed to the sheathing of an interior wall of a building before brick veneer is laid adjacent thereto;

Figure 5 is a longitudinal sectional view of a wall of a building showing the meter mount of Figures 1 to 4 holding a meter socket on the exterior of the brick veneer; and, Figure 6 is a perspective view of a modified form of the meter mount illustrated in Figures 1 to 5.

In the drawings, the numeral 10 designates a meter socket mount constructed in accordance with one embodiment of the invention and which includes an elongate rectangular plate 11 which may be affixed to the sheathing 12 of an interior wall of a building by nails, screws or the like, 13 and 14. The nails extend through suitable apertures 15 and 16 provided adjacent opposite ends of the plate. A pair of spaced rectangular apertures 17 and 18 are also provided in the plate to engage the rectangular bosses 19 and 20 of the supporting bolts 21 and 22, respectively, which extend through the rectangular apertures. The plate 11 has a pair of spaced longitudinally extending strengthening ribs 23 and 24 which are formed along the longitudinal edges of the plate. These ribs also serve to space the plate from the sheathing so that the heads 25 of the supporting bolts may be positioned and confined between the sheathing 12 and the plate. The ribs are of such height that they engage the sheathing about the same time the bolt heads are gripped between the plate and the sheathing. The supporting bolts are thus held immovable when the plate 11 is affixed to the sheathing.

A large aperture 26 is provided in the plate 11 through which may extend an electric conduit, cable, or the like 27 (Figure 5) from the meter socket 28 to the interior of the building. The meter socket and sheathing 12 are in this case provided with registering apertures 29 and 30 respectively.

In use, the supporting bolts 21 and 22, the plate 11 and a spacing strap 31, whose function will be hereinafter described, are packaged in a disassembled position with the bolts lying parallel to the plate 11 so that the whole mount can be shipped in a small flat envelope or package. When the mount 10 is to be installed, the supporting bolts 21 and 22 are inserted through the rectangular apertures 17 and 18, respectively, with their rectangular bosses disposed in the rectangular recesses and with their heads 25 disposed between the ribs 23 and 24, as shown in Figure 3. The plate 11 is then secured to the sheathing 12 by hammering the nails 13 and 14 into the sheathing through the apertures 15 and 16, respectively. The heads 25 of the supporting bolts will thus be disposed between and abut the sheathing and the plate, and will thus be held firmly in the position illustrated in Figure 4. The engagement of the rectangular bosses 19 and 20 of the supporting bolts with the edges of the rectangular apertures of the plate prevents rotation of the bolts about their longitudinal axes.

Since the bricklayers, in laying brick veneer adjacent the sheathing 12, and beneath, between and above the bolts, may strike the supporting bolts and displace them from the position perpendicular to the plate 11 illustrated in the drawings, the spacing strap 31 may be secured to the outer threaded ends of the bolts by nuts 32 and 33, the ends of the strap 31 being provided with apertures through which the bolts extend. The spacing strap is shown as arcuate in form but may be provided with an aperture in a straight bar, so that the conduit 27, which may extend through the apertures 30 and 26 in the sheathing and the plate, may also extend past the spacing strap 31 without having to be bent, as would be the case if the spacing strap were straight, without an aperture.

After the mount 11 is mounted on the sheathing in the manner illustrated in Figure 4, the brick veneer 34 may be laid. The veneer consists of bricks 35 joined in the conventional manner by mortar, the mortar forming vertical joints 36 between adjacent vertical spaced ends of the bricks and horizontal joints 37 between horizontal spaced sides of the bricks. As shown in Figure 5, the bricks are so laid that the supporting bolts extend through the mortar joints. The bricks will also be broken to form a vertical opening, also filled with mortar, not shown in Figure 5, through which the conduit 27 extends. The non-uniformity in the appearance of the brick veneer resulting from the creation of an additional vertical opening or joint will not be apparent and the non-uniform section of the brick veneer will be covered by the meter socket 28.

The mortar in the joints is allowed to set about the bolts and the conduit, which are thus held rigidly by the mortar. After the mortar has set the outer nuts 33 on the bolts are unscrewed and the spacing strap 31 is removed. The inner nuts 32 are then tightened against the brick veneer and the meter socket is mounted on the protruding ends of the supporting bolts which extend through suitably spaced apertures in the back wall 38 of the socket. The outer nuts 33 are then again screwed on the supporting bolts to firmly hold the socket against the inner nuts 32. The meter socket will then be held firmly on the wall in a position substantially abutting the brick veneer 34. The electrical conduit 27 may be led into the socket through a conventional "knockout" opening in one of the sides of the socket, if so desired.

It will be apparent that the meter mount 10 having the plate 11 and supporting bolts 21 and 22 may be disassembled for shipment in a small flat package. It will also be evident that the meter mount may be installed on a wall without drilling holes in the brick veneer of the wall simply by nailing or screwing the plate 11 to the sheathing 12 of the wall with the supporting bolts held in their properly spaced positions, shown in Figure 4; whereupon the brick veneer may be laid about and between the supporting bolts, the bolts being disposed in mortar joints between adjacent bricks. It will also be noted that the spaced longitudinal ribs 23 and 24 of the plate provide for the heads of the supporting bolts to be clamped firmly between the plate and the sheathing, and that the engagement of the rectangular bosses 19 and 20 of the bolts in the rectangular apertures 17 and 18 of the plate prevents rotation of the supporting bolts so that the nuts 33 may be tightly screwed on the outer threaded ends of the bolts.

A modified form of the meter socket mount is illustrated in Figure 6. The mount 40 of Figure 6 includes an elongate plate 41 provided with outwardly turned longitudinal side flanges or edges 42 and 43. The outwardly turned edges serve to stiffen the plate. The plate 41 is provided with spaced apertures 44 and 45 through which nails may extend to fasten the plate 44 to the sheathing or a crosspiece of an inner structure. Elongate bolts 46 and 47 have their inner ends welded to the plate 41, as at 48 and 49, respectively. The bolts 46 and 47 are thus held rigidly in position perpendicular to the plate, and the spacing strap 31 of the form previously described is not needed.

The plate 41 may be provided with an aperture 50 which is similar to the aperture 26 of the plate 11 and serves the same purpose. The meter socket mount is installed in the same manner as the mount 10, with the exception that the spacing strap is not employed. A detailed description of the method of installation of the mount 40 therefore will not be set forth.

If desired, the plate 41 could be a thick rectangular piece of metal, in which case the side edges would not have to be turned outwardly. Where the plate 41 is made of relatively thin sheet metal, it is advisable to turn the side edges upwardly to stiffen and strengthen the plate, or the plate may be stiffened with longitudinal strengthening ribs such as the ribs 23 and 24 of the form first described.

Where the term "brick veneer" has been used herein, it is to be understood that the term is applicable to any type of masonry veneer, stucco, or similar structure.

The foregoing description of the invention is explanatory only, and changes in the details of the method and construction illustrated may be made by those skilled in the art, within the scope of the appended claims, without departing from the spirit of the invention.

What I claim and desire to secure by Letters Patent is:

1. In combination: an interior wall having an exterior brick veneer; a meter socket provided with spaced apertures therein; and a mount for mounting said meter socket on said exterior wall, said mount comprising an elongate rectangular plate having longitudinally extending stiffening means disposed adjacent its longitudinal edge portions, said plate having longitudinally spaced apertures therein for receiving fastening means to secure said plate to said interior wall, said plate also having a plurality of longitudinally spaced elongate supporting bolts extending perpendicularly from said plate through joints in the brick veneer, said bolts being of a length substantially greater than the thickness of said brick veneer whereby the outer ends of the bolts project beyond the outer surface of said brick veneer and are adapted to extend through the spaced apertures in said meter socket, and means on the outer ends of said bolts for removably securing the meter socket in place on the outer ends of said bolts exteriorly of the brick veneer, and means extending through the aperture in said rectangular plate and connected to said interior wall for removably holding said plate on said interior wall.

2. The combination of claim 1 wherein the stiffening means on the plate comprises flange-like ribs turned outwardly in substantially the same direction as the bolts extend.

3. A mount for mounting a meter socket provided with spaced apertures on an interior wall having a brick veneer comprising an elongate rectangular plate having a pair of spaced longitudinal ribs projecting from one face of said plate, said plate having means for securing said plate to said interior wall, said ribs being adapted to abut said interior wall and hold said plate in spaced relation thereto, said plate having a plurality of longitudinally spaced rectangular apertures between said ribs; and a plurality of elongate supporting bolts having rectangular bosses adjacent their heads, each of said supporting bolts removably extending through one of associated rectangular apertures with its head disposed between said ribs and with its rectangular boss disposed in the associated rectangular aperture whereby rotation of the bolt is prevented, said bolts extending outwardly and perpendicularly from the face of said plate opposite the face from which the ribs project, said bolts being adapted to extend through joints in the brick veneer, said bolts having threaded outer ends adapted to project beyond the outer surface of said brick veneer and to extend through said spaced apertures in said meter socket.

4. The device of claim 3, and a spacing strap removably secured to said outer threaded ends of said bolts for releasably initially holding said bolts in predetermined spaced relation.

5. The device of claim 4 characterized in that said plate is provided with an aperture through which an electrical conduit may extend to the meter socket, said spacing strap being arcuate and concentrically spaced from said last mentioned aperture whereby said conduit may extend in a straight line through said aperture and past said spacing strap.

6. A mount for mounting a meter socket provided with spaced apertures on an interior wall having a brick veneer comprising an elongate relatively thin flat rectangular plate having a front surface and a back surface, said plate having a pair of spaced longitudinal ribs projecting from the back surface of said plate, said plate having means for securing said plate to said interior wall, said ribs being adapted to abut said interior wall and holding said plate in spaced relation thereto, said plate having a plurality of longitudinally spaced rectangular apertures between said ribs; and a plurality of elongate supporting bolts having rectangular bosses adjacent their heads, each of said supporting bolts removably extending through one of associated rectangular apertures with its head disposed between said ribs and with its rectangular boss disposed in the associated rectangular aperture whereby rotation of the bolt is prevented, said bolts extending outwardly and perpendicularly from the front surface of said plate and having threaded outer ends adapted to project outwardly beyond said brick veneer and to extend through said spaced apertures in said meter socket, said plate being provided with an aperture between said bolts through which an electrical conduit may extend to the meter socket.

References Cited in the file of this patent

UNITED STATES PATENTS

| | | |
|---|---|---|
| 996,137 | Praeger | June 27, 1911 |
| 1,018,675 | Mueller | Feb. 27, 1912 |
| 1,066,463 | Carl | July 8, 1913 |
| 1,086,343 | Anderson | Feb. 10, 1914 |
| 1,541,644 | Herbermann | June 9, 1925 |
| 1,557,515 | Wooley | Oct. 13, 1925 |
| 1,565,391 | Pierce | Dec. 15, 1925 |
| 1,659,404 | Lipschutz | Feb. 14, 1928 |
| 1,693,396 | Littleton | Nov. 27, 1928 |
| 1,739,829 | Fedeerman | Dec. 17, 1929 |
| 1,854,633 | Stephens | Apr. 19, 1932 |
| 2,509,328 | Anderson | May 30, 1950 |